(12) United States Patent
Konradi et al.

(10) Patent No.: US 9,912,216 B2
(45) Date of Patent: Mar. 6, 2018

(54) ARRANGEMENT FOR DETERMINING THE ANGULAR POSITION OF A SHAFT OF AN ELECTRIC MOTOR, AND WINDSCREEN WIPER MOTOR WITH AN ARRANGEMENT FOR DETERMINING THE ANGULAR POSITION

(71) Applicant: Valeo Systèmes d'Essuyage, Le Mesnil Saint Denis (FR)

(72) Inventors: Johann Konradi, Sinsheim (DE); Jörg Bürkle, Grossachsenheim (DE)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 39 days.

(21) Appl. No.: 14/375,207

(22) PCT Filed: Jan. 31, 2013

(86) PCT No.: PCT/EP2013/051862
§ 371 (c)(1),
(2) Date: Jul. 29, 2014

(87) PCT Pub. No.: WO2013/113794
PCT Pub. Date: Aug. 8, 2013

(65) Prior Publication Data
US 2015/0002001 A1 Jan. 1, 2015

(30) Foreign Application Priority Data
Feb. 1, 2012 (DE) .................. 10 2012 100 829

(51) Int. Cl.
*H02K 11/00* (2016.01)
*G01D 5/20* (2006.01)
(Continued)

(52) U.S. Cl.
CPC ................ *H02K 29/08* (2013.01); *B60S 1/08* (2013.01)

(58) Field of Classification Search
CPC .............. H02K 11/21; H02P 7/00; G01B 7/03
(Continued)

(56) References Cited

U.S. PATENT DOCUMENTS 4,785,241 A * 11/1988 Abiko .................... G01D 5/145
324/207.21
4,982,125 A 1/1991 Shirakawa
(Continued)

FOREIGN PATENT DOCUMENTS

DE 103 18 062 A1 11/2004
DE 102008042402 * 4/2010 ........... H02K 11/215
(Continued)

OTHER PUBLICATIONS

International Search Report for International Application No. PCT/EP2013/051862, dated Apr. 19, 2013 (3 pages).
(Continued)

*Primary Examiner* — Jose Gonzalez Quinones
(74) *Attorney, Agent, or Firm* — Osha Liang LLP

(57) ABSTRACT

The invention relates to an arrangement (20) for determining the angular position of a shaft (11) of an electric motor (10), in particular of a shaft (11) of a windscreen wiper motor (100), with a magnet element arrangement, connected with the shaft (11), and several magnetic field sensors (26, 27, 28), wherein the angular position of the shaft (11) is inferred from the different signals of the magnetic field sensors (26, 27, 28). Provision is made, according to the invention, for the magnet element arrangement to comprise at least one magnet element, preferably several separate magnet elements (21, 22, 23), which are arranged one behind the other in the longitudinal direction of the shaft (11), and for the
(Continued)

Figure 1:
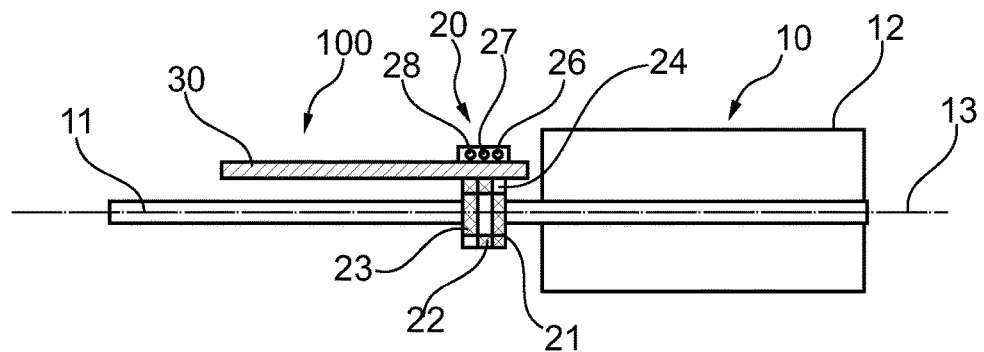

magnetic field sensors (26, 27, 28) to be arranged on a printed circuit board (30) which is arranged at a slight distance from the shaft (11), such that the magnetic fields of the magnet elements (21, 22, 23) are able to be determined by the magnetic field sensors (26, 27, 28).

12 Claims, 1 Drawing Sheet

(51) Int. Cl.
  *G01D 5/12*  (2006.01)
  *G01D 5/14*  (2006.01)
  *H02K 29/08*  (2006.01)
  *B60S 1/08*  (2006.01)

(58) Field of Classification Search
  USPC ........ 310/68 B; 324/207.21, 207.25, 207.12
  See application file for complete search history.

(56) References Cited

U.S. PATENT DOCUMENTS

| | | | |
|---|---|---|---|
| 5,019,776 A * | 5/1991 | Kawamata | G01P 3/488 324/207.12 |
| 6,373,241 B1 | 4/2002 | Weber et al. | |
| 6,791,219 B1 | 9/2004 | Eric et al. | |
| 7,023,203 B2 * | 4/2006 | Miyashita | G01D 5/2451 324/207.25 |
| 2005/0127762 A1 * | 6/2005 | Miyashita | G01D 5/145 318/400.38 |
| 2005/0127906 A1 * | 6/2005 | Miyashita | G01D 5/2451 324/207.25 |
| 2005/0253578 A1 * | 11/2005 | Kawashima | G01D 5/24419 324/207.25 |
| 2006/0226802 A1 * | 10/2006 | Marentette | B60S 1/08 318/443 |
| 2008/0246374 A1 | 10/2008 | Hartmann et al. | |
| 2012/0319680 A1 | 12/2012 | Ueda et al. | |

FOREIGN PATENT DOCUMENTS

| | | |
|---|---|---|
| DE | 11 2008 002 170 T5 | 6/2010 |
| DE | 20 2009 008 646 U1 | 12/2010 |
| DE | 10 2009 051 978 A1 | 5/2011 |
| EP | 1 780 875 A2 | 5/2007 |
| JP | 2001-506368 A | 5/2001 |
| JP | 2004-270671 A | 9/2004 |
| JP | 2008160941 A * | 7/2008 |
| WO | 2009/141275 A1 | 11/2009 |
| WO | 2011108421 A1 | 9/2011 |

OTHER PUBLICATIONS

Search Report for German Application No. 10 2012 100 829.9, dated Dec. 5, 2012 (5 pages).
First Office Action issued in corresponding Chinese Application No. 201380010014.5, dated Nov. 18, 2015 (14 pages).
Chinese Office Action Issued in Corresponding Application No. 201380010014.5, dated Jun. 2, 2017 (16 Pages with Eglish Translation).
Notice of Reason for Rejection issued in corresponding Japanese Patent Application No. 2014-555194, dated Dec. 5, 2017 (9 pages).

* cited by examiner

ARRANGEMENT FOR DETERMINING THE ANGULAR POSITION OF A SHAFT OF AN ELECTRIC MOTOR, AND WINDSCREEN WIPER MOTOR WITH AN ARRANGEMENT FOR DETERMINING THE ANGULAR POSITION

PRIOR ART

The invention relates to an arrangement for determining the angular position of a shaft of an electric motor, in particular a shaft of a windscreen wiper motor, according to the preamble of Claim 1. The invention also relates to a windscreen wiper motor using an arrangement according to the invention.

An arrangement according to the preamble of Claim 1 is known in practice and serves to determine the exact position of a drive shaft of an electric motor so that said electric motor, when used as a windscreen wiper motor, can be driven by a control arrangement in such a way that the wiper blades of a windscreen wiper arrangement, which wiper blades are operatively connected to the windscreen wiper motor, can be stopped, for example, at a specific point in time. The arrangements known from the prior art use Hall sensors for this purposes, said Hall sensors determining the magnetic field of a magnet element which is arranged on the shaft of the electric motor. In this case, the Hall sensors are arranged in different radial positions around the shaft of the electric motor, with the result that a specific angular position of the shaft can be inferred from the combination of signals determined by the Hall sensors. The Hall sensors are each in the form of separate components and are connected to a control arrangement or an evaluation circuit by means of corresponding electrical connecting lines, said control arrangement or evaluation circuit being arranged on a printed circuit board which is arranged inside the electric motor and serves to control the electric motor.

Disclosure of the Invention

Proceeding from the described prior art, the invention is based on the object of developing an arrangement for determining the angular position of a shaft of an electric motor according to the preamble of Claim 1 in such a way that said arrangement can be produced in a particularly simple and cost-effective manner and furthermore is relatively flexible in respect of the arrangement on the electric motor. According to the invention, this object is achieved with an arrangement for determining the angular position of a shaft of an electric motor with the features of Claim 1 in that the magnet arrangement comprises at least one magnet element, preferably several separate magnet elements, which are arranged one behind the other in the longitudinal direction of the shaft, and in that the magnetic field sensors are arranged on a printed circuit board which is arranged at a slight distance from the shaft, such that the magnetic fields of the magnet arrangement are able to be determined by the magnetic field sensors. In other words, this means that special arrangement of the magnet elements in the longitudinal direction of the shaft makes it possible to arrange the magnetic field sensors directly on the printed circuit board, so that said magnetic field sensors can determine the magnetic fields of the magnet arrangement. Therefore, additional and complex and also expensive cabling means between the magnetic field sensors and the evaluation circuit on the printed circuit board are avoided.

Advantageous developments of the arrangement according to the invention for determining the angular position of a shaft of an electric motor are cited in the dependent claims. All combinations of at least two features which are disclosed in the claims, the description and/or the figures fall within the scope of the invention.

An arrangement of the magnetic field sensors on that printed circuit board which serves at the same time to receive the components for controlling the windscreen wiper motor is very particularly preferred. As a result, an additional printed circuit board is not required for the windscreen wiper motor; rather, the usually single printed circuit board for receiving the magnetic field sensors which is already present suffices.

In a refinement which is preferred from a structural respect, the at least one magnet element is constructed in a ring shape and surrounds the (armature or rotor) shaft radially.

In order to be able to determine the rotation angle position of the shaft, provision is made for the magnet elements to be arranged at a differing rotation angle position on the shaft. As a result, different magnetic fields (north/south pole combinations) are generated by the individual magnet elements at a specific angular position of the shaft and can be evaluated by means of an evaluation circuit in order to thereby be able to determine the respective angular position of the shaft within the scope of a specific resolution.

The use of the invention in brushless electric motors in which the rotor position has to be determined for the purpose of correct commutation is particularly preferred. However, it goes without saying that, in principle, it is also expedient and possible in conventional (brush) electric motors where it may likewise be necessary to know the angular position of the rotor shaft. When used in brushless electric motors, the arrangement according to the invention is suitable both for two-pole electric motors and for four-pole electric motors and also for eight-pole electric motors (in general for n-pole motors). In this case, provision is made, depending on the respective number of poles of the electric motor, for each magnet element, depending on the number of poles of the electric motor, to have respectively 2 poles in a 2-pole electric motor, respectively 4 poles in a 4-pole electric motor and respectively 8 poles in an 8-pole electric motor.

In order to simplify evaluation of the signals from the magnetic field sensors, provision is made for three magnet elements to be provided, these magnet elements preferably being arranged offset with respect to each other by respectively 120°. An arrangement of this kind makes it possible, in practice, for the angular position of the shaft of the electric motor to be accurately determined with a resolution of 10°, this often having proven sufficient in practice.

A structure of the arrangement which is as compact as possible is furthermore achieved when the magnet elements (be they realized as elements in the shape of a ring or in the form of several elements in the shape of a ring) adjoin each other directly, viewed in the axial direction of the shaft. In this case, it is also possible, for example, to adhesively bond the individual magnet elements to one another, so that they can be mounted on the shaft in a relatively simple manner as a composite component and at the same time have a high strength as an assembly. As an alternative, a single magnet element is also feasible, this being suitable for use with several magnetic field sensors by virtue of corresponding magnetization.

Furthermore, a position of the magnet elements outside a motor housing of the electric motor is preferably provided. As a result, firstly the installation space for the motor housing can be very compact since the magnet elements and the magnetic field sensors do not have to be arranged within the motor housing, and secondly it is possible to use the (single) printed circuit board of the electric motor since it can be of a size which is, for example, larger than the diameter of the motor housing.

Production is further simplified when the magnetic field sensors are constructed as Hall sensors in SMD construction. SMD components of this kind are used in large numbers in industry and connected to the printed circuit board by reflow soldering in particular, as a result of which cost-effective production processes with a high level of manufacturing quality can be achieved.

The invention also comprises a windscreen wiper motor with an arrangement according to the invention. A windscreen wiper motor of this kind can be produced at relatively low cost and with a particularly compact structure.

Figure 2:
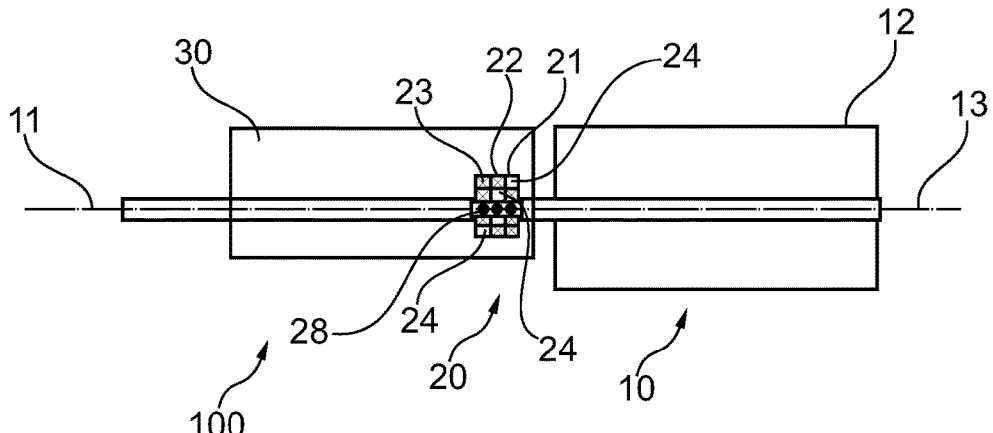
Figures 3, 4:
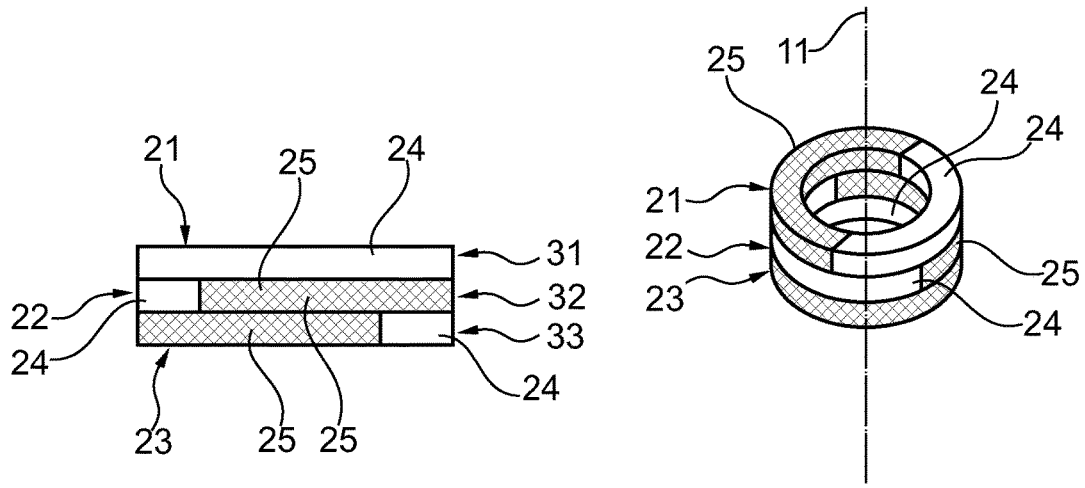

Further features, advantages and details of the invention can be found in the following description of preferred exemplary embodiments and with reference to the drawing, in which:

FIG. 1 shows a simplified side view of parts of a windscreen wiper motor using an arrangement according to the invention for determining the angular position of a shaft of a brushless electric motor, FIG. 2 shows a plan view of the arrangement according to FIG. 1, FIG. 3 shows a perspective view of a magnet arrangement which comprises three magnet elements in the shape of a ring, and FIG. 4 shows a side view of the magnet arrangement according to FIG. 3.

Identical components or components with the same function are provided with the same reference numerals in the figures.

FIGS. 1 and 2 show highly simplified parts of a windscreen wiper motor 100 which is a constituent part of a windscreen wiper system of a vehicle, for example a windscreen wiper system for cleaning a front windscreen of the vehicle. The windscreen wiper motor 100 comprises a brushless electric motor 10 which has a rotor shaft 11 with magnet elements which is rotatably mounted within a cylindrical motor housing 12, and which interacts with stator windings (not illustrated in the figures) which are likewise arranged in the motor housing 12.

The use of a conventional (brush) electric motor 10 likewise lies within the scope of the invention. Shell-like magnet elements which are arranged within the motor housing 12 in the form of constituent parts of the electric motor and an iron-containing magnetic return path element if the motor housing 12 does not already contain iron or is composed of steel are not illustrated either.

The rotation speed of the electric motor 10 can likewise be reduced in a manner which is known per se by means of a step-down gear mechanism (not illustrated) by a tooth geometry which is formed on the rotor shaft 11 on the side averted from the motor housing 12 meshing with a mating tooth system on an output drive wheel.

In order to drive the windscreen wiper motor 100 or to move the windscreen wiper in a positionally accurate manner, it is necessary to be able to accurately determine the (rotation) angle position of the rotor shaft 11. It is also necessary to know the rotor position in order to correctly electrically commutate the electric motor 10. In the case of brush electric motors, it may possibly be necessary to additionally know the position of a gear wheel which interacts with the rotor shaft 11. In practice, it is usually sufficient to be able to accurately determine the angular position of the rotor shaft 11 with a degree of accuracy or a resolution of 10°. In order to allow this, the electric motor 10 has an arrangement 20 according to the invention. In the illustrated exemplary embodiment, in which it is assumed that the electric motor 10 is in the form of a 2-pole (brushless) electric motor 10, the arrangement 20 comprises three magnet elements 21 to 23 which are each in the shape of a ring and are identical and are arranged one behind the other in relation to the longitudinal axis 13 of the rotor shaft 11. As can be seen with reference to FIG. 3 in particular, the three magnet elements 21 to 23 adjoin one another directly as viewed in the axial direction of the rotor shaft 11 and are, for example, adhesively bonded to one another. The magnet elements 21 to 23 radially surround the rotor shaft 11.

It should additionally be mentioned that, instead of three magnet elements 21 to 23, it is also possible to use a single magnet element with a corresponding magnetization.

Each of the three magnet elements 21 to 23 comprises in each case a magnetic south pole 24 and a magnetic north pole 25 which each have a rotational angle range of 180°. The three magnet elements 21 to 23 are arranged offset with respect to each other by respectively 120° in the exemplary embodiment.

It should additionally be mentioned that, in the case of a 4-pole (brushless) electric motor 10, the magnet elements 21 to 23 have respectively four poles, and when used on an 8-pole (brushless) electric motor 10, the magnet elements 21 to 23 have respectively eight poles.

When the rotor shaft 11 rotates about the longitudinal axis 13, the three magnet elements 21 to 23 generate magnetic fields, it being possible to determine the intensity and orientation of said magnetic fields by means of three magnetic field sensors 26 to 28. The magnetic field sensors 26 to 28 which are constructed as Hall sensors are preferably constructed as SMD components and arranged in a manner oriented with respect to the magnet elements 21 to 23 in this case. As seen with reference to FIGS. 2 and 3, the magnetic field sensors 26 to 28 are arranged directly on a printed circuit board 30 or are connected to said printed circuit board, with the printed circuit board 30 being arranged outside the motor housing 12, as are the magnet elements 21 to 23. In addition to the magnetic field sensors 26 to 28 (which may possibly be arranged in a common housing or constructed on a common chip), the printed circuit board 30 is fitted with further components (not shown in FIGS. 1 and 2) which serve, in particular, to control the windscreen wiper motor 100, for example resistors, capacitors, ICs. In the illustrated exemplary embodiment, the magnetic field sensors 26 to 28 are arranged on that side of the printed circuit board 30 which is averted from the magnet elements 21 to 23. It goes without saying that the scope of the invention also covers the situation of the magnetic field sensors 26 to 28 being arranged directly opposite the magnet elements 21 to 23 in such a way that the printed circuit board 30 is located on that side of the magnetic field sensors 26 to 28 which is averted from the magnet elements 21 to 23.

The three magnet elements 21 to 23 form, as can be seen with reference to FIG. 4 in particular, three tracks 31 to 33 which can be determined by the magnetic field sensors 26 to 28.

The arrangement 20 according to the invention described up to this point can be modified in a variety of ways without departing from the concept of the invention. Other possible uses in addition to determining the (rotation) angle position of a windscreen wiper motor 100 are likewise feasible.

LIST OF REFERENCE SYMBOLS

10 Electric motor
11 Rotor shaft
12 Motor housing
13 Longitudinal axis
20 Arrangement
21 Magnet element
22 Magnet element
23 Magnet element
24 South pole
25 North pole
26 Magnetic field sensor
27 Magnetic field sensor
28 Magnetic field sensor
30 Printed circuit board
31 Track
32 Track
33 Track
100 Windscreen wiper motor

The invention claimed is:

1. An arrangement for determining an angular position of a shaft of a windscreen wiper motor, comprising:
   a magnet element arrangement, connected with the shaft, and a plurality of magnetic field sensors,
   wherein the angular position of the shaft is determined from a plurality of different signals of the magnetic field sensors,
   the magnet element arrangement comprising a plurality of separate identical magnet elements arranged one behind the other in the longitudinal direction of the shaft,
   wherein the magnetic field sensors are arranged on a printed circuit board which is arranged at a slight distance from the shaft, such that the magnetic fields of the plurality of separate identical magnet elements are determined by the magnetic field sensors, and
   wherein the plurality of separate identical magnet elements are three magnets arranged offset with respect to each other by 120°.

2. The arrangement according to claim 1, wherein the printed circuit board serves at the same time to receive the components for controlling the windscreen wiper motor.

3. The arrangement according to claim 1, wherein the plurality of separate identical magnet elements are constructed in a ring shape and surrounds the shaft radially.

4. The arrangement according to claim 3, wherein the plurality of separate identical magnet elements are arranged at differing rotation angle positions on the shaft.

5. The arrangement according to claim 4, wherein each magnet element, depending on the number of poles of the brushless electric motor, has respectively 2 poles in a 2-pole electric motor, respectively 4 poles in a 4-pole electric motor and respectively 8 poles in an 8-pole electric motor.

6. The arrangement according to claim 4, wherein the three magnet elements adjoin each other directly, viewed in axial direction of the shaft.

7. The arrangement according to claim 1, wherein the plurality of separate identical magnet elements are arranged outside a motor housing.

8. The arrangement according to claim 1, wherein the magnetic field sensors are constructed as Hall sensors in SMD construction.

9. A windscreen wiper motor comprising an arrangement according to claim 1.

10. An arrangement for determining an angular position of a shaft of a windscreen wiper motor, comprising:
    a magnet element arrangement, connected with the shaft, and a plurality of magnetic field sensors,
    wherein the angular position of the shaft is determined from a plurality of different signals of the magnetic field sensors,
    the magnet element arrangement comprising a plurality of separate identical magnet elements arranged one behind the other in the longitudinal direction of the shaft, wherein the plurality of separate magnet elements adjoin one another directly,
    wherein the magnetic field sensors are arranged on a printed circuit board which is arranged at a slight distance from the shaft, such that the magnetic fields of the plurality of separate identical magnet elements are determined by the magnetic field sensors, and
    wherein the plurality of separate identical magnet elements are three magnets arranged offset with respect to each other by 120°.

11. An arrangement for determining an angular position of a shaft of a brushless electric motor, comprising:
    a magnet element arrangement, connected with the shaft, and a plurality of magnetic field sensors,
    wherein the angular position of the shaft is determined from a plurality of different signals of the magnetic field sensors,
    the magnet element arrangement comprising a plurality of separate identical magnet elements constructed in a ring shape and surrounding the shaft radially, wherein the magnet elements are arranged one behind the other in the longitudinal direction of the shaft and wherein the magnet elements are arranged at differing rotation angle positions on the shaft,
    wherein the magnetic field sensors are arranged on a printed circuit board which is arranged at a slight distance from the shaft, such that the magnetic fields of the plurality of separate identical magnet elements are determined by the magnetic field sensors, and
    wherein the plurality of separate identical magnet elements are three magnets arranged offset with respect to each other by 120°.

12. The arrangement according to claim 1, wherein the plurality of separate identical magnet elements are not arranged on the printed circuit board on which the magnetic field sensors are located.

* * * * *